United States Patent
Sbisa

(10) Patent No.: US 7,567,558 B1
(45) Date of Patent: *Jul. 28, 2009

(54) TELECOMMUNICATIONS SERVICE CONTROL POINT INTERFACE

(75) Inventor: Daniel Charles Sbisa, Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 863 days.

This patent is subject to a terminal disclaimer.

(21) Appl. No.: 10/778,657

(22) Filed: Feb. 12, 2004

Related U.S. Application Data

(63) Continuation of application No. 10/331,787, filed on Dec. 30, 2002, now Pat. No. 6,714,539, which is a continuation of application No. 09/324,277, filed on Jun. 2, 1999, now Pat. No. 6,529,504.

(51) Int. Cl.
*H04L 12/50* (2006.01)

(52) U.S. Cl. .................. 370/385; 370/352; 370/466; 379/221.09; 379/230

(58) Field of Classification Search .................. None
See application file for complete search history.

(56) References Cited

U.S. PATENT DOCUMENTS

| | | | |
|---|---|---|---|
| 5,583,920 A | 12/1996 | Wheeler, Jr. | |
| 5,694,463 A | 12/1997 | Christie et al. | |
| 5,793,853 A | 8/1998 | Sbisa | |
| 6,101,242 A * | 8/2000 | McAllister et al. | 379/88.02 |
| 6,122,363 A * | 9/2000 | Friedlander et al. | 379/230 |
| 6,144,644 A | 11/2000 | Bajzath et al. | |
| 6,208,642 B1 | 3/2001 | Balachandran et al. | |
| 6,215,783 B1 | 4/2001 | Neyman | |
| 6,282,275 B1 | 8/2001 | Surbani et al. | |
| 6,295,345 B1 | 9/2001 | Pullen | |
| 6,404,880 B1 | 6/2002 | Stevens | |
| 6,438,220 B1 | 8/2002 | Liu | |
| 6,519,331 B1 | 2/2003 | Stevens et al. | |
| 6,529,504 B1 | 3/2003 | Sbisa | |
| 6,714,539 B1 | 3/2004 | Sbisa | |
| 6,798,868 B1 * | 9/2004 | Montgomery et al. | 379/88.21 |
| 2005/0021713 A1 * | 1/2005 | Dugan et al. | 709/223 |

* cited by examiner

*Primary Examiner*—Duc C Ho

(57) ABSTRACT

A service control point comprising multiple interfaces configured to receive multiple query messages from requesting devices using multiple different protocols, wherein all of the interfaces provide access to the call processing applications within the SCP. The service control point is configured to process the query messages and generate response messages, which are transmitted back to the requesting devices using their respective protocols.

11 Claims, 6 Drawing Sheets

TELECOMMUNICATIONS SERVICE CONTROL POINT INTERFACE

RELATED APPLICATIONS

This application is a continuation of prior U.S. patent application Ser. No. 10/331,787, filed Dec. 30, 2002, entitled "Telecommunications Service Control Point Interface" currently pending, which is a continuation of U.S. Pat. No. 6,529,504, filed Jun. 2, 1999, which are hereby incorporated by reference into this application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to a telecommunications Service Control Point (SCP), and specifically, to an SCP having interfaces configured to receive messages in a plurality of protocols, transmit those messages to a plurality of call processing applications, receive response messages from the call processing applications, and transmit those response messages in the plurality of protocols.

2. Description of the Prior Art

In a telecommunications network, an SCP provides service information to devices in the network using call processing applications within the SCP. Some examples of service information provided by the SCP include special service number routing information, post-pay calling card information, and pre-paid calling card information.

A telecommunications resource provides services to a call and is sometimes referred to as a service platform. Typically, resources are used to provide services to a call requiring interaction with the caller. For example, resources are used to collect and validate calling card numbers and special service number pin codes. Where caller interaction is required to process a call, the network uses a "connect to resource" call processing application in the SCP to connect the call to a resource. The resource provides services to the call based on the called and calling number. After providing the service, the resource is disconnected and the call is routed to the call destination usually via one or more switches in the network.

In one example of the "connect to resource" call processing application, a telecommunications switch may receive a call from a user that requires voice response interaction before the call is connected to the called destination. The switch processes the call and sends a query message to the SCP. The SCP generates a connect to resource response message for the switch that routes the call from the switch to a resource. The SCP also sends a context message containing call information to the resource. After receiving the call from the switch and the context information from the SCP, the resource plays prompts and collects digits from the caller. The resource processes the call by validating the digits and sending a transfer request message to the SCP. The SCP processes the transfer request message, disconnects the resource, and sends a response message to the switch that routes the call to the final destination.

The SCP includes two interfaces used to exchange messages with the telecommunications network, a Signaling System (SS7) Transactional Capabilities Application Part (TCAP) and an Internet Protocol (IP) interface. The TCAP interface also includes message transfer part functionality and SS7 signaling connection control part functionality. Unfortunately, the IP interface is dedicated to the "connect to resource" call processing application. The IP interface cannot be used to access other call processing applications such as number validation and special service number call processing. These applications can only be accessed through the SS7 TCAP interface. Thus, if a resource is used for a special service number call requiring access to the special service number call processing application in the SCP, the IP message from the resource must be routed to the TCAP interface through a converter. The converter converts the IP message to an SS7 TCAP message for the TCAP interface. However, these converters add additional equipment and maintenance requirements on the network and on the network administrators.

It is desirable in the art of telecommunications to have an SCP capable of receiving multiple queries in multiple different protocols so that communication devices can access the various call processing applications within the SCP without the use of converters.

SUMMARY OF THE INVENTION

The present invention advances the art by providing an SCP capable of receiving query messages from multiple communications devices using multiple protocols, and processing the query messages to return response messages back to the communication devices using their respective protocols. Advantageously, the present SCP is configured so that any device conforming to the interface message rules can interact directly with the SCP. In addition, the SCP acts as a gateway for devices to access other call processing applications in the telecommunications network.

The present SCP comprises multiple interfaces connected to multiple call processing applications. For clarity, only the operation of a first and second interface and a first and second call processing application are summarized herein, as illustrative of the SCP operation for other interfaces and call processing applications. The first interface is configured to receive a first query message in a first protocol and transfer the first query message to a first call processing application, receive a third query message in the first protocol and transfer the third query message to a second call processing application. The second interface is configured to receive a second query message in a second protocol and transfer the second query message to the first call processing application, and receive a fourth query message in the second protocol and transfer the fourth query message to the second call processing application.

The first call processing application is configured to process the first query message to generate a first response message containing first call-handling information for a first call, and process the second query message to generate a second response message containing second call-handling information for a second call. The second call processing application is configured to process the third query message to generate a third response message containing third call-handling information for a third call, and process the fourth query message to generate a fourth response message containing fourth call-handling information for a fourth call.

DETAILED DESCRIPTION OF THE PREFERRED EMBODIMENT

Overview

The SCP of the present invention can provide call handling information for calls using internal call processing applications or the SCP can act as a gateway to other devices in a telecommunications network that can provide call handling information for calls. Operationally, query messages are sent to the SCP from a requesting device. The SCP processes the query message using call processing applications internal to the SCP or generates another query message to an external device and receives a response message from that device. After processing the call, the SCP returns a response message to the requesting device. One example of an external device is a Line Information Database (LIDB). It should be noted that in the context of this application, the first, second, third, fourth, etc. connotations used to reference the messages and call processing applications are used solely for the purpose of differentiating between different messages and call processing applications and are not used to indicate a message sequence or processing sequence.

Figure 1:
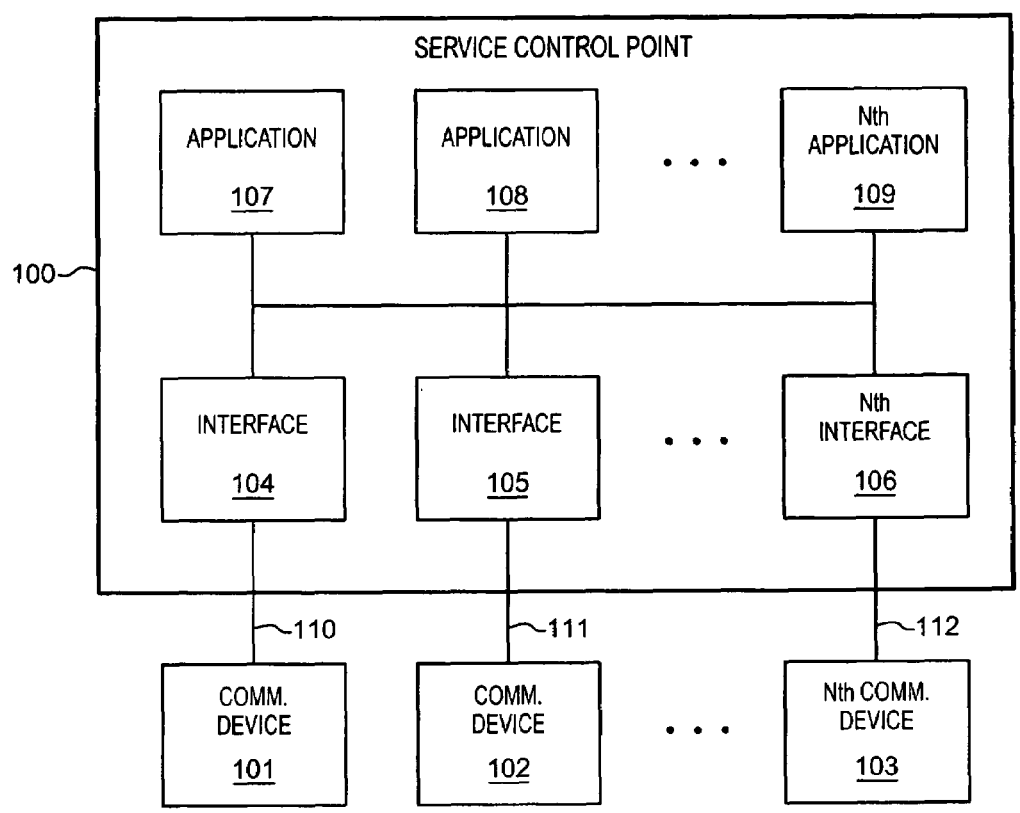
FIG. 1 illustrates a system configuration for internal call processing in an example of the present invention.

SCP Architecture and Operation for Internal Call Processing—FIG. 1:

FIG. 1 depicts SCP 100, and communication devices 101, 102, and 103. SCP 100 comprises first call processing application 107, second call processing application 108, Nth call processing application 109, first interface 104, second interface 105, and Nth interface 106. Multiple call processing applications, multiple interfaces, and multiple communication devices are depicted on FIG. 1 although only call processing applications 107, 108, and 109, interfaces 104, 105, and 106 and communications devices 101, 102, and 103 are shown for clarity. Call processing applications 107, 108, and 109, are connected to interfaces 104, 105, and 106 so that interfaces 104, 105, and 106 can access any of call processing applications 107, 108, and 109. One skilled in the art will appreciate that a specific interface could still be dedicated to a specific call processing application as long as multiple interfaces provide access to multiple processing applications. Interface 104 is connected to communication device 101 by link 110. Interface 105 is connected to communication device 102 by link 111, and interface 106 is connected to communication device 103 by link 112.

In operation, different communications device e.g. 101, 102, and 103 using different protocols can access SCP 100. For example, SCP 100 could receive any number of messages from a single user device e.g. 101 if that device is capable of supporting a service. Additionally, SCP 100 could receive any number of messages in random order from multiple devices using multiple protocols where multiple devices are required to support the service.

By way of example, interface 104 could be any interface capable of: 1) receiving multiple query messages in a first protocol, 2) transferring those query messages to call processing applications 107, 108, and 109, 3) receiving response messages from call processing applications 107, 108, and 109, and 4) transferring those response messages in the first protocol. By way of example, interface 104 could be any interface capable of: 1) receiving a first query message, a third query message, and an eighth query message in a first protocol, 2) transferring the first query message to call processing application 107, transferring the third query message to call processing application 108, transferring the eighth query message to call processing application 109, 3) receiving a first response message from call processing application 107, receiving a third response message from call processing application 108, receiving an eighth response message from call processing application 109, and 4) transmitting the first, the third, and the eighth response messages in the first protocol.

Interface 105 could be any interface capable of: 1) receiving multiple query messages in a second protocol, 2) transferring those query messages to call processing applications 107, 108, and 109, 3) receiving response messages from call processing applications 107, 108, and 109, and 4) transferring those response messages in the second protocol. By way of example, interface 105 could be any interface capable of: 1) receiving a second query message, a fourth query message, and a ninth query message in a second protocol, 2) transferring the second query message to call processing application 107, transferring the fourth query message to call processing application 108, transferring the ninth query message to call processing application 109, 3) receiving a second response message from call processing application 107, receiving a fourth response message from call processing application 108, receiving a ninth response message from call processing application 109, and 4) transmitting the second, the fourth, and the ninth response messages in the second protocol.

Interface 106 could be any interface capable of: 1) receiving multiple query messages in a third protocol, 2) transferring those query messages to call processing applications 107, 108, and 109, 3) receiving response messages from call processing applications 107, 108, and 109, and 4) transferring those response messages in the third protocol. By way of example, interface 106 could be any interface capable of: 1) receiving a fifth query message, a sixth query message, and a seventh query message in a third protocol, 2) transferring the fifth query message to call processing application 109, transferring the sixth query message to call processing application 108, transferring the seventh query message to call processing application 107, 3) receiving a fifth response message from call processing application 109, receiving a sixth response message from call processing application 108, receiving a seventh response message from call processing application 107, and 4) transmitting the fifth, the sixth, and the seventh response messages in the third protocol.

Link 110 could be any link capable of exchanging communications between interface 104 and communication device 101 in the first protocol. Link 111 could be any link capable of exchanging communications between interface 105 and communication device 102 in the second protocol. Link 112 could be any link capable of exchanging communications between interface 106 and communication device 103 in the third protocol. Some examples of the first protocol, the second protocol, and the third protocol include but are not limited to SS7 TCAP, Transmission Control Protocol/Internet Protocol (TCP/IP), and Asynchronous Transfer Mode Protocol (ATM).

Call processing applications 107, 108 and 109 could be any call processing applications capable of processing a query message to generate call-handling information for a call. By way of example, call processing application 107 could be any call processing application capable of: 1) processing the first query message to generate the first response message containing first call handling information for a first call, processing the second query message to generate the second response message containing second call handling information for a second call, and processing the seventh query message to generate the seventh response message containing seventh call handling information for a seventh call. Call processing application 108 could be any call processing application capable of: 1) processing the third query message to generate the third response message containing third call handling information for a third call, processing the fourth query message to generate the fourth response message containing fourth call handling information for a fourth call, and processing the sixth query message to generate the sixth response message containing sixth call handling information for a sixth call. Call processing application 109 could be any call processing application capable of: 1) processing the fifth query message to generate the fifth response message containing fifth call handling information for a fifth call, processing the eighth query message to generate the eighth response message containing eighth call handling information for an eighth call, and processing the ninth query message to generate the ninth response message containing ninth call handling information for a ninth call.

Some examples of call processing applications 107, 108, and 109 include but are not limited to, call routing applications and call validation applications. An example of a call routing application is providing routing information for a call to a special service number. Special service numbers include but are not limited to, toll free numbers, emergency numbers, portable numbers, mobile terminal numbers, and plain old telephone service (POTs) numbers. Some examples of call validation applications include providing calling card validation, caller number validation, caller entered digit validation, and caller account code validation information.

Communication device 101 could be any device configured to transmit the first query message, the third query message, and the eighth query message to interface 104 in the first protocol, and receive the first response message, the third response message, and the eighth response message from interface 104 in the first protocol. Communication device 102 could be any device configured to transmit the second query message, the fourth query message, and the ninth query message to interface 105 in the second protocol, and receive the second response message, the fourth response message, and the ninth response message from interface 105 in the second protocol. Communication device 103 could be any device configured to transmit the fifth query message, the sixth query message, and the seventh query message to interface 106 in the third protocol, and receive the fifth response message, the sixth response message, and the seventh response message from interface 106 in the third protocol. Some examples of communications devices 101, 102, and 103 include but are not limited to, switches, service platforms and servers.

Figure 2:
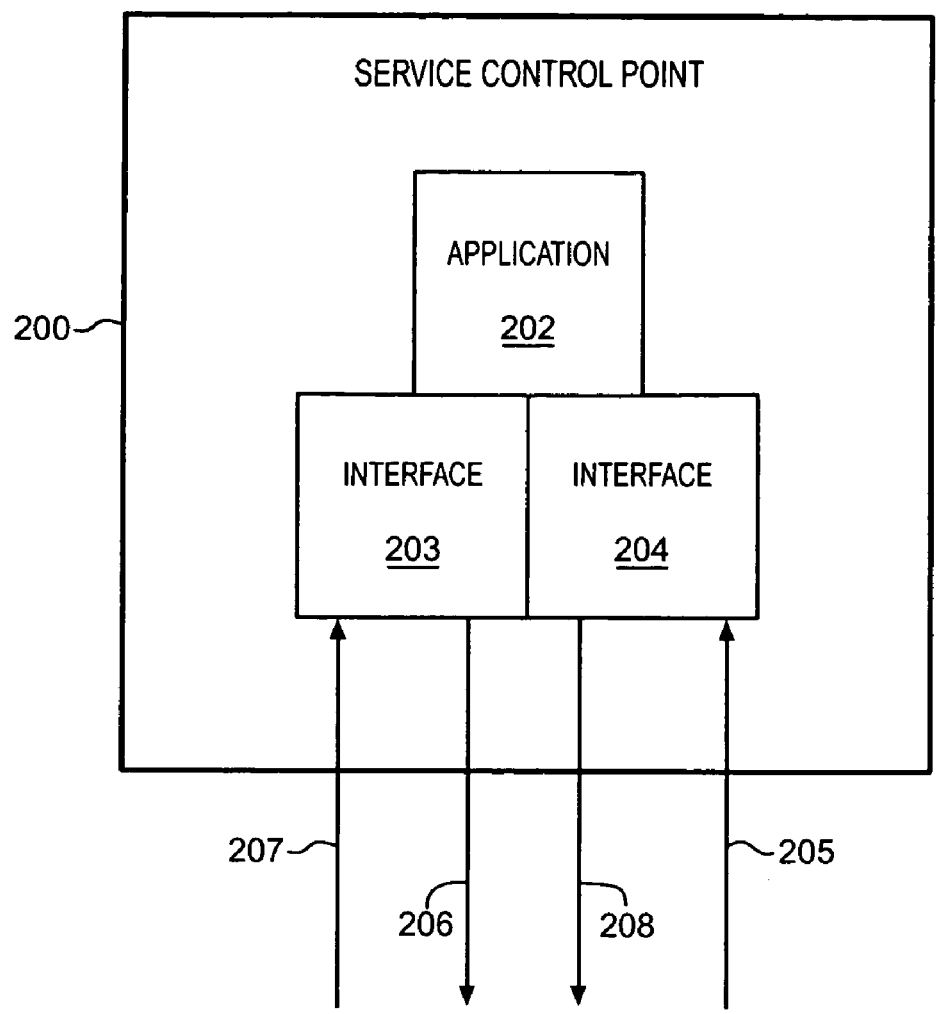
FIG. 2 illustrates a system configuration for external queries in an example of the present invention.

System Configuration and Operation for External Queries—FIG. 2:

FIG. 2 depicts SCP 200, first query message 205, second response message 208, second query message 206, and first response message 207. SCP 200 comprises call processing application 202, first interface 204, and second interface 203. One skilled in the art will appreciate that SCP 200 would typically comprise multiple call processing applications and multiple interfaces although only call processing application 202 and interfaces 203 and 204 are shown for clarity.

Call processing application 202 could be any call processing application capable of processing a first query message 205 to generate a second query message 206 and process a first response message 207 to generate a second response message 208. Interface 204 could be any interface capable of receiving first query message 205 in a first protocol, transferring first query message 205 to call processing application 202, receiving second response message 208 from call processing application 202, and transferring second response message 208 in the first protocol. Interface 203 could be any interface capable of receiving second query message 206 from call processing application 202, transferring second query message 206 in SS7 TCAP protocol, receiving first response message 207 in SS7 TCAP protocol, and transferring first response message 207 to call processing application 202. Some examples of the first protocol include but are not limited to TCP/IP and ATM.

Example of a TCP/IP Protocol Interface Operation—FIGS. 3-6

The following description is an example of the operation of an SCP having a TCP/IP interface using a TCP/IP protocol communication link to a Service Platform, as illustrative of how other interfaces using other protocols could operate. Those skilled in the art will appreciate that various other configurations and operations can be derived from the following example that are within the scope of the present invention, and thus, the example is for the purpose of illustration and not limitation.

Service Platforms provide a unique service function that is not technically and/or economically possible on a switch or an SCP. Some examples of Service Platforms include but are not limited to an Enhanced Service Platform (ESP), an Operator Center, a Prepaid Card Platform, and Postpaid Card Platform. The validation operation uses a message set to validate a series of digits collected by the Service Platform. Once the SCP has determined the status of the digits presented in the validation request, the SCP responds to the Service Platform with the information required, allowing the Service Platform to continue processing. The TCP/IP messages sent by the Service Platform inter-work with validation applications currently available on SCPs. Primarily the calling card, LIDB and Account Code validation applications. Those skilled in the art will appreciate that new validation applications can be added to the SCP as validation applications are established in the Service Platforms.

The TCP/IP interface is a separate process that accesses applications developed for call processing in the SCP. The TCP/IP interface is not tied to a call processing application. The TCP/IP interface process is distributed across multiple CPUs to ensure maximum performance and survivability.

The TCP/IP interface uses the information elements from message sets to determine what application to reference for call processing. Message sets include Context Request messages, Context Response and Transfer messages, and Validation Request and Validation Response messages. The TCP/IP interface uses the message type information to determine what functions to perform. Some examples of message types information include but are not limited to, a called number, a caller's number, and an Internet address.

The TCP/IP interface determines which call processing application to reference based on the message type and message contents. The TCP/IP interface parses the message contents and extracts the information required in making the appropriate application selection. Once an application is identified the TCP/IP interface process passes the contents of the message to the application and the application performs the functions designated for that application. Once the application is complete, the application decides if information should be reported back to the TCP/IP interface. If information is reported back to the TCP/IP interface the interface uses the information to assemble the appropriate message. For example, a message type of Context Request instructs the SCP that a context file should be located based on a call reference identification database (CRID). Once the context file is located the information for a Context Response is returned to the TCP/IP interface and a Context Response message returned. A message type of Validation Request instructs the SCP that a validation should be made based on validation type. Once the validation application is complete it sends the appropriate information to the TCP/IP interface and a Validation Response message is returned.

The TCP/IP interface enables the SCP to interact with multiple Service Platforms and other call processing platforms in a client/server relationship. In this relationship the SCP is the server and Service Platforms and/or other call processing devices e.g. Switches and/or other communication devices are the clients.

Message Processing for the TCP/IP Interface:

The messaging between the TCP/IP interface and the Service Platform (client) is structured using variable message lengths to ensure the most flexibility. The variable length messages begin with a fixed length message header. Two key functions are associated to the message header, one is to define the type of message and two is to specify the length of the message. All query messages, as well as all response messages exchanged between the SCP and the Service Platform or other call processing devices begins with a message header.

The Message Header information defines the message type, the message originator and a time stamp. The Message Length defines the length in bytes of information contained within the Message Contents. The Message Contents contains the information parameters exchanged between the SCP and the Service Platform or other call processing device. The receiving device interprets the Message Contents. The maximum amount of allowable contents is 65536 bytes.

The TCP/IP interface begins message processing by reading the contents of the Message Header. If the TCP/IP interface is unable to detect a Message Header message type, the TCP/IP interface errors the message. If a Message Header message type is detected the TCP/IP interface performs the following steps:
 1. Read message buffer bytes until the TCP/IP interface has read the message header message size byte value;
 2. extract the message size from the just read message header;
 3. loop reading bytes from the socket until the message size bytes;
 4. process message; and
 5. return to step one.

The approach outlined here is not to call read with the third step being the size of the arbitrarily large buffer, instead the process specifies the maximum number of bytes that are read into the buffer on each call. This results in minimizing the parsing required since the message header information is extracted. After using the size of the message from the message header, the exact message is extracted from the buffer. Therefore, there is no need for special end of file delimiters or complicated parsing routines. The end of the buffer is always identified through the TCP/IP interface reading all the data.

It is extremely unlikely that it will take more than a single iteration of the loop to read the message header or the message. However, since TCP delivers a stream of bytes and has no knowledge of the application sending messages, more than a single iteration is possible. Thus, the loop exists as a precaution.

The SCP uses the Message Type from the message header to determine which application should process the message. The SCP uses the Message Length from the message header to determine if additional message information is still within the TCP/IP buffer. The TCP/IP interface must be able to handle multiple messages within a single TCP/IP message buffer. Some examples of message types include but are not limited to, a called number, a caller's number, and an Internet address.

A preferred feature of the invention is the ability to use any of the messages over a single socket interface between the SCP and the Service Platform. Meaning, if the Service Platform is connected to the SCP for already established messages, a Service Platform could develop Validation messages and use the same socket used for the already established message to pass and receive Validation messages.

Figure 3:
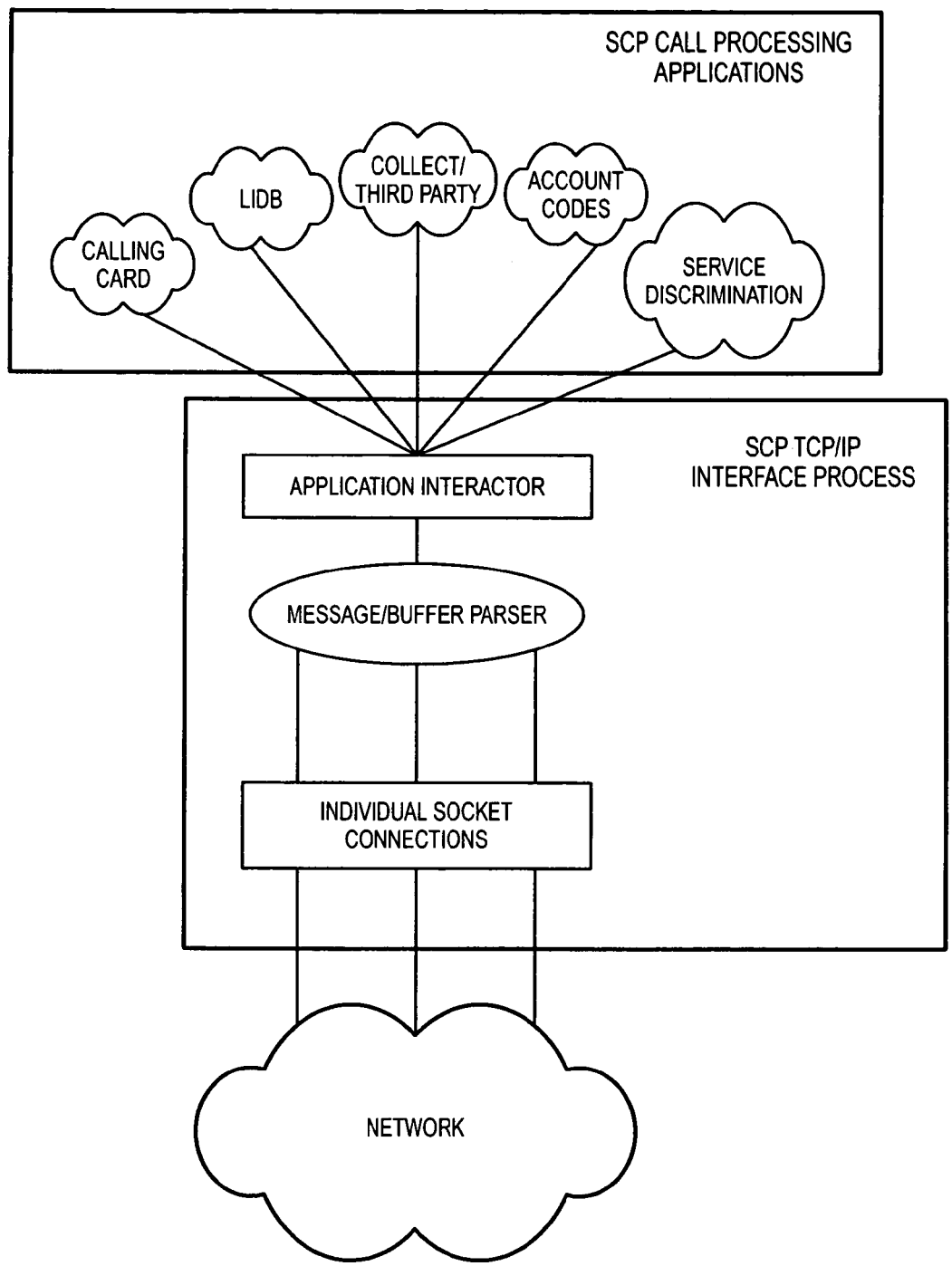
FIG. 3 illustrates an interface configuration in an example of the invention.
Figure 4:
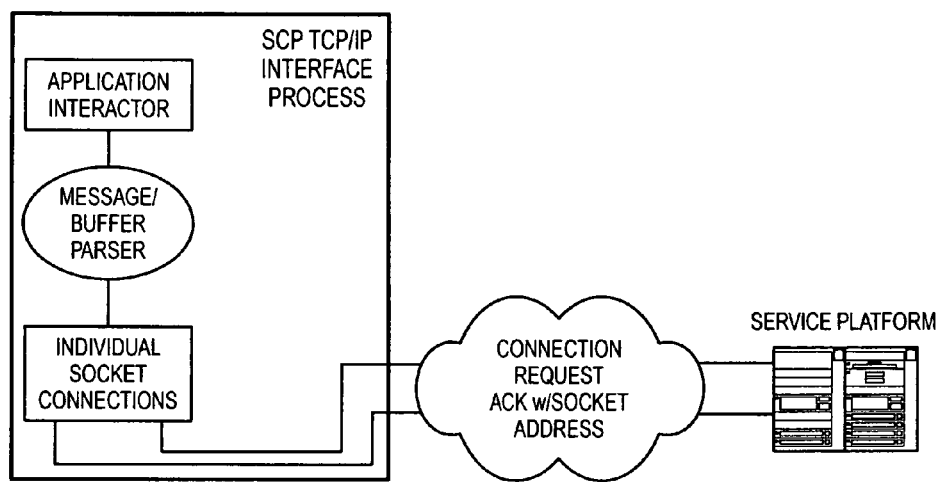
FIG. 4 illustrates SCP connection and initialization in an example of the invention FIG. 5; illustrates SCP operation in an example of the invention.

Connection Establishment, Initialization and Disconnect FIGS. 3, 4, 5 and 6:

Referring to FIGS. 3 and 4, the TCP/IP interface functions independent of any specific call process application, but may interact with all call processing applications. An Initialize message from the Service Platform or call processing device is associated to a specific socket. Messages passed by the Service Platform are checked for buffer size and parsed. The application interactor processes the message type information to determine which application should be used to process the message. If required the call processing application returns information to the TCP/IP interface and the appropriate message response is assembled and sent to the appropriate IP address.

The requesting device has the address of the socket it will communicate through. The initialize message is received and the socket is ready to process messages. Messages are passed to the Message/Buffer Parser to determine if multiple messages exist within a single buffer.

Figure 5:
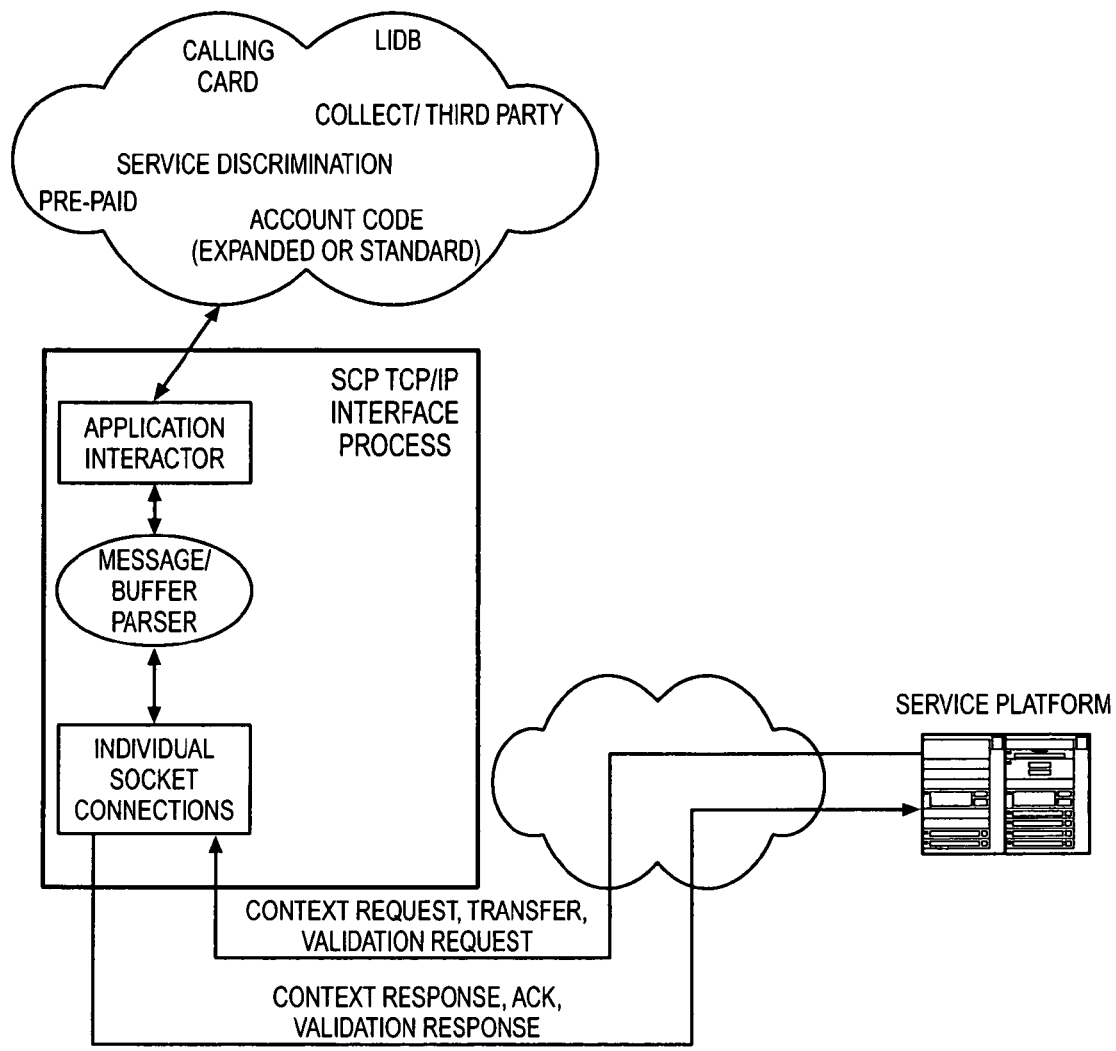

Referring to FIG. 5, an application message (Context Request, Transfer or Validation Request) is sent from the Service Platform to the SCP. The message buffer size is calculated and the contents of the message buffer are parsed. Message type information is used by the application interactor to determine which, application to use and the message size is tracked to determine the end of the buffer. It is possible that a single socket on the Service Platform could be supporting more than one service, so multiple messages could be received within the same buffer. The parsing algorithm should be able to detect multiple messages within a single buffer. The application interactor uses the message type to determine the application desired by the message. The Application interactor, once an application is identified, interacts with the required application for the needed functional operations.

Figure 6:
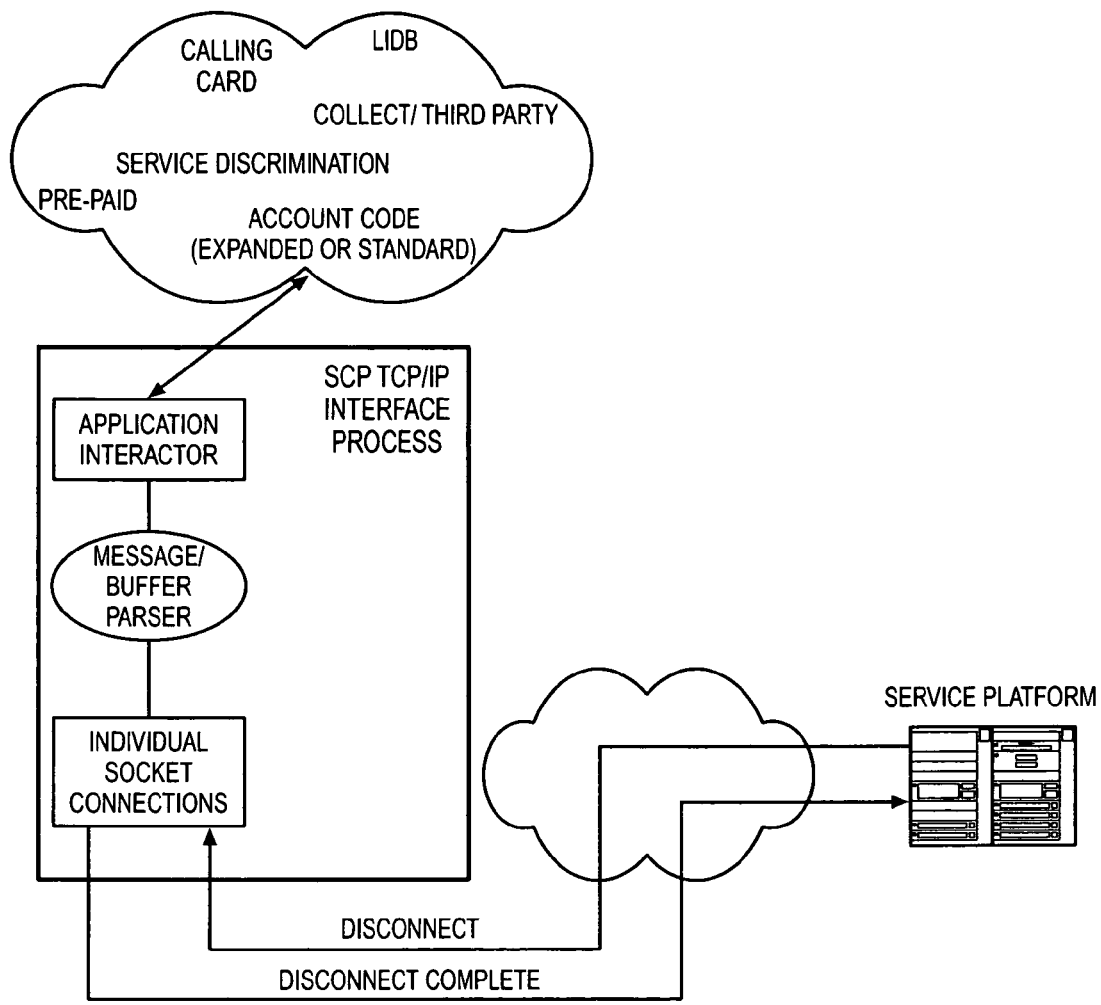
FIG. 6 illustrates a disconnection operation in an example of the invention.

Referring to FIG. 6, the Service Platform initiates disconnect through the Disconnect message. The TCP/IP interface reports to the client that the process is no longer associated to the IP address. In some situations the Service Platform may assume the connection between the service platform and the SCP no longer exists. However, the SCP would assume that the connection continues to exist. In this case the Service Platform would make a connection request that would be processed by the master socket controller. The master socket controller would determine that the IP address of the Service Platform was already assigned to an individual socket connection. This allows the SCP to determine when a Service Platform has terminated a socket connection and then report the need to establish a new connection.

The TCP/IP connection at the SCP is used to support multiple connection operations between the SCP and Service Platforms. As new operations are introduced the appropriate messages are defined to support the desired operations. Currently, the SCP supports a set of message operations for call processing. Those message operations include Context Request, Context Response and Transfer messages.

Time Out Condition:

If the SCP does not respond to the Validation Request in the time required by the Service Platform, the Service Platform assumes a Validation Response of valid and assumes default feature information. The time-out period is specific to the Service Platform. In addition, the default Feature Information is specific to the Service Platform.

Software Product Instructions:

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

The invention claimed is:

1. A method of operating a Service Control Point (SCP), the method comprising:
    receiving a first message in a first format from a first communication device wherein the first message comprises a context message and wherein the first message indicates caller information collected by the first communication device from a caller for a call;
    processing the first message in the first format to determine routing information for the call, wherein the first format comprises Internet Protocol (IP); and
    transferring a second message for the call in a second format to a second communication device, wherein the second message indicates the routing information for the call and wherein the second format is different than the first format.

2. The method of claim 1 wherein the caller information includes an account code for the caller and wherein processing the first message comprises processing the account code for the caller to determine the routing information for the call.

3. The method of claim 1 further comprising processing the caller information to validate the caller.

4. The method of claim 1 wherein the second format comprises Signaling System Seven (SS7).

5. The method of claim 1 wherein the second message comprise a Signaling System Seven (SS7) message.

6. A Service Control Point (SCP) comprising:
    a first interface configured to receive a first message in a first format from a first communication device wherein the first message comprises a context message and wherein the first message indicates caller information collected by the first communication device from a caller for a call;
    a processing system configured to process the first message in the first format in a server system to determine routing information for the call, wherein the first format comprises Internet Protocol (IP); and
    a second interface configured to transfer a second message for the call in a second format to a second communication device, wherein the second message indicates the routing information for the call and wherein the second format is different than the first format.

7. The Service Control Point (SCP) of claim 6 wherein the caller information includes an account code for the caller, and wherein the processing system is configured to process the account code to determine the routing information.

8. The Service Control Point (SCP) of claim 6 wherein the processing system is configured to process the caller information to validate the caller.

9. The Service Control Point (SCP) of claim 6 wherein the second format comprises Signaling System Seven (SS7).

10. The Service Control Point (SCP) of claim 6 wherein the second message comprises a Signaling System Seven (SS7) message.

11. A method of operating a Service Control Point (SCP), the method comprising:
    receiving a first message in a first format from a first communication device wherein the first message indicates caller information collected by the first communication device from a caller for a call;
    processing the first message in the first format to determine routing information for the call, wherein the first format comprises Internet Protocol (IP); and
    transferring a second message for the call in a second format to a second communication device, wherein the second message indicates the routing information for the call and wherein the second format is different than the first format.

* * * * *